United States Patent [19]
Ohnishi et al.

[11] 4,212,018
[45] Jul. 8, 1980

[54] LASER BEAM RECORDING SYSTEM

[75] Inventors: Masahiro Ohnishi; Yuji Ohara; Hiroshi Oono, all of Asaka, Japan

[73] Assignee: Fuji Photo Film Co., Ltd., Minami-ashigara, Japan

[21] Appl. No.: 3,347

[22] Filed: Jan. 15, 1979

[30] Foreign Application Priority Data

Jan. 17, 1978 [JP] Japan .................................. 53/3480

[51] Int. Cl.$^2$ ........................ G01D 15/10; G01D 9/42
[52] U.S. Cl. .................................. 346/76 L; 346/108
[58] Field of Search ............................. 346/76 L, 108

[56] References Cited

U.S. PATENT DOCUMENTS

| | | | |
|---|---|---|---|
| 3,573,849 | 4/1971 | Herrit et al. | 346/108 |
| 4,002,829 | 1/1977 | Hutchison | 346/76 L X |
| 4,123,780 | 10/1978 | Honjo | 346/76 L X |

Primary Examiner—George H. Miller, Jr.
Attorney, Agent, or Firm—Gerald J. Ferguson, Jr.; Joseph J. Baker

[57] ABSTRACT

In a laser beam recording system employing a rotating polygonal mirror for deflecting a recording light beam and a read-out light beam for synchronization, a linear encoder is used to generate a video clock signal in synchronization with the photoelectric pulse signal obtained through the linear encoder. In the video clock signal generator, a clock signal is divided into 1/n where n is an integral number to provide a reference pulse signal to be compared with the photoelectric pulse signal. The displacement of the phase of the photoelectric pulse signal from the reference pulse signal is detected and is corrected by a phase comparator. Thus, a video clock signal having a frequency of n-times as large as that of the photoelectric pulse signal is generated.

8 Claims, 4 Drawing Figures

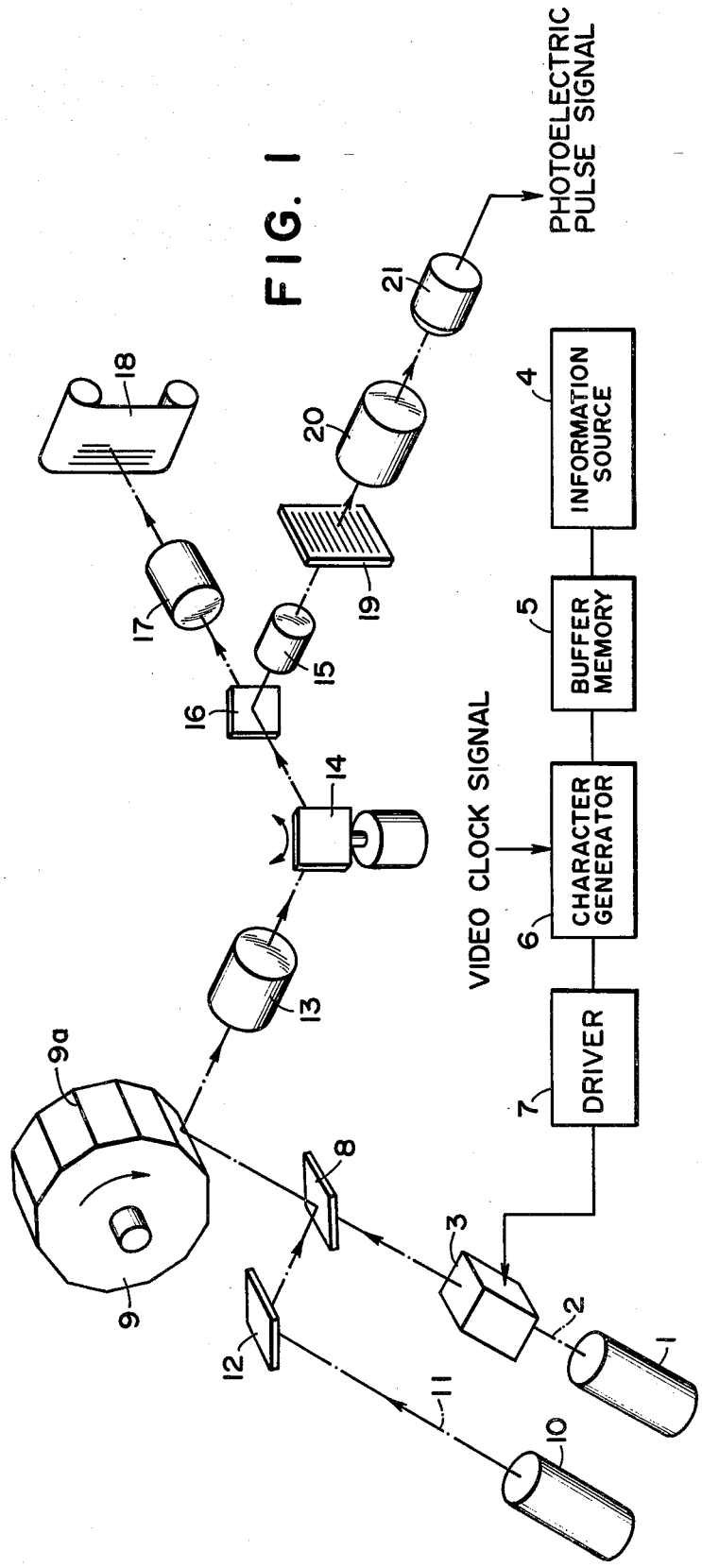
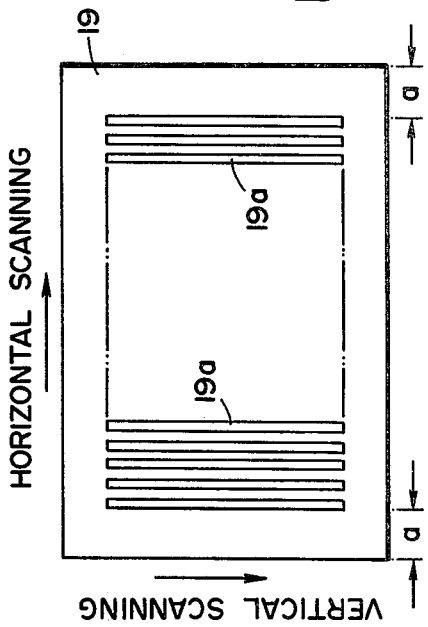

LASER BEAM RECORDING SYSTEM

BACKGROUND OF THE INVENTION

1. Field of the Invention

This invention relates to a laser beam recording system, and more particularly to an improvement in a laser beam recording system in which a video clock signal is generated in synchronization with a photoelectric pulse signal obtained through a linear encoder scanned with a laser beam deflected by a rotating polygonal mirror.

2. Description of the Prior Art

In a laser beam recording system, a video signal is generated by a character generator upon input of a video clock signal into the system and the video signal controls a light modulator which conducts amplitude modulation of a laser beam. The amplitude-modulated laser beam is deflected by a rotating polygonal mirror to form rasters on a photosensitive material and record characters in the form of a dot pattern.

Since it is substantially difficult to rotate a polygonal mirror at a precisely constant speed and there is a speed fluctuation in practice, the position of the dots is displaced and the dot pattern or the form of the recorded characters is deformed. Further, since the pitch of the dots is made larger in the marginal portions with respect to the central portion when the polygonal rotating mirror is used, it is difficult to record characters in a good form.

In view of the above mentioned difficulties of the conventional laser beam recording system, it has been known to use a linear encoder having a number of parallel slits arranged in the scanning direction scanned with a read-out beam prepared in addition to a recording beam and input the photoelectric pulse obtained through the linear encoder into a character generator as a video clock signal so that the dots are recorded at correct positions in view of the scanning position of the rotating polygonal mirror according to which a video signal is generated, as disclosed for instance in U.S. Pat. No. 3,389,403.

The above-described system using a linear encoder is, however, desirable only in case that the number of dots on the scan lines is small. When the number of dots is more than 2000, there are problems as follows. In the case where the resolution is so high, the pitch of the slits on the linear encoder is too small to enable the easy production of the linear encoder. Further, when the pitch of the slits is small, the photoelectric pulse signal is generated even by the dust or scratches on the slits, which results in reading mistakes through the linear encoder and mis-recording of the dot pattern.

SUMMARY OF THE INVENTION

It is therefore the principal object of the present invention to provide a video clock signal generating device in a laser beam recording system in which scanning of high resolution is correctly conducted.

More specific object of the present invention is to provide a video clock signal generating device in a laser beam recording system using a linear encoder in which the linear encoder is not required to have accurately processed slits of fine pitch and accordingly the linear encoder can be easily produced.

Another object of the present invention is to provide a video clock signal generating device in a laser beam recording system in which the position of the initial dots in respective scan lines is correctly determined.

Other objects will be made apparrant from the detailed description of the invention with reference to a particular embodiment thereof.

The video clock signal generating device for a laser beam recording system in accordance with the present invention is characterized in that the photoelectric pulse signal obtained by a linear encoder is used as a video clock signal after being divided into 1/n. In other words, the number of pulses is increased to an integral number of times as large as the original number of pulses and then the pulses of the large number are used as the video clock signal. The photoelectric pulse signal is compared with a reference pulse signal which is obtained by dividing a clock pulse by a divider into 1/n times as large as the original clock pulse. The divided clock pulses and the photoelectric pulse signal are compared with each other by a phase comparator and the oscillator is controlled by a feedback method so that the two kinds of signals coincide with each other. Thus, a video clock signal which is synchronized with the photoelectric pulse signal and the number of which is increased to an integral number (n) of times as large as the original number is generated. This operation will hereinbelow be referred to as "n-times multiplication" or "to be n-times multiplied" where the number "n" is an integral number. The n-time multiplication can be conducted by use of a phase lock loop (PLL) circuit. The photoelectric pulse signal is n-time multiplied by the PLL circuit and is used as a video clock signal. By using the n-times multiplied pulse signal as the video clock signal, the width of the slits of the linear encoder and the pitch of the slits may be large, and accordingly there is no fear of mis-reading due to dusts or scratches in the slits and the production of the linear encoder is facilitated.

Since in the PLL circuit there is a substantially constant delay in response, the phase of the photoelectric pulse is not immediately registered with the phase of the reference pulse signal upon generation of the photoelectric pulse signal. Therefore, there are provided a preset counter for counting the photoelectric pulse signal, a flip flop which is set by the output of the preset counter, and a gate circuit for making a logic sum of the output of the flip flop and the clock signal of the generator, so that the gate circuit is opened to send a clock signal passing therethrough to a character generator as a video clock signal only after a time period required for the phase of the photoelectric pulse signal to coincide with the phase of the reference pulse signal (lock-up time) has lapsed. The maximum lock-up time can be measured and a time period can be known in terms of the number of pulses. Therefore, the above-described arrangement can easily be made by opening the gate circuit in response to counting of a predetermined number of pulses of the photoelectric pulse signal. Hence, the generation of the video clock signal is initiated when the phase of the photoelectric pulse signal and that of the reference pulse signal have coincided with each other. Accordingly, in the lock-up time the clock signal from the generator is not allowed to pass through the gate circuit even if the photoelectric pulse signal comes to the gate circuit, which results in alignment of the positions of the initial dots in all the effective scan lines.

Further, in this invention, the lock-up time is shortened and accordingly the length of the effective scan lines is enlarged, which results in high resolution of the recorded information. This is conducted by resetting the divider for outputting the reference pulse signal with the initial photoelectric pulse signal and compulsorily causing the phase of the photoelectric pulse signal to coincide with that of the reference pulse signal. In this arrangement, the frequency of the photoelectric pulse signal and that of the reference pulse signal are different from each other. However, since the phases are in coincident with each other temporarily, this system has a shorter lock-up time in comparison with the system in which the phases are brought into coincident with each other by a feedback method with the phases out of alignment. Further, in a predetermined period after initiation of scanning the photoelectric pulse signal is not generated, which period is called blanking period. In this invention, a constant D.C. voltage is impressed to the oscillator in the blanking period to control the oscillator so that the frequency of the reference pulse signal becomes close to that of the photoelectric pulse signal. With this arrangement, the difference between the frequency of the reference pulse signal and that of the photoelectric pulse signal is made small when the blanking period is terminated and the photoelectric signal start to be generated, which results in a short lock-up time required for making the phases coincide with each other.

As the linear encoder, as is well known in the art, various types can be used such as an opaque plate having a number of parallel slits, a plate or sheet having a number of alternately arranged opaque portions and transparent portions, and a plate having a number of parallel narrow reflecting portions at a constant pitch.

BRIEF DESCRIPTION OF THE DRAWING

FIG. 1 is a perspective representation of a laser beam recording system to which the present invention is applicable, FIG. 2 is a front view of an example of a linear encoder which can be employed in this invention.

DESCRIPTION OF THE PREFERRED EMBODIMENT

Figure 3:
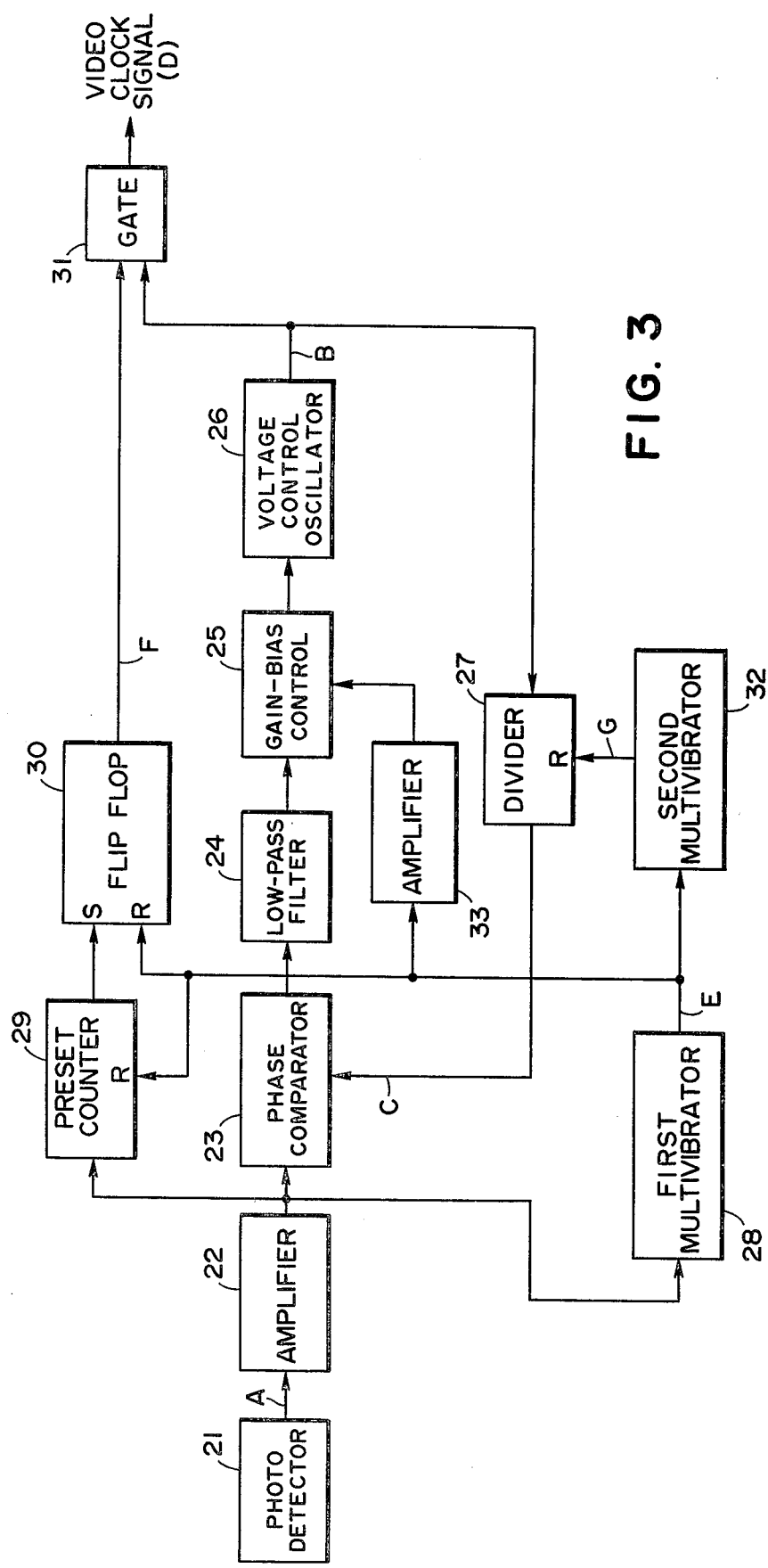
FIG. 3 is a block diagram showing the structure of a PLL circuit constituting the essential part of the present invention.

Now the present invention will be described in detail with reference to a preferred embodiment thereof referring to the accompanying drawing.

As shown in FIG. 1 which shows a laser beam recording system employing a video clock signal generating device in accordance with the present invention, a recording laser beam source 1 emits a recording light beam 2 which is amplitude-modulated by a light modulator 3. The light modulator 3 is ON-OFF controlled by a video signal or a dot signal. In more detail, an information source 4 such as a computer or a magnetic tape system stores character information as a code signal. The code signal is memorized in a buffer memory 5 once and then is read out at a different speed from the recording speed and sent to a character generator 6. The character generator 6 generates a video signal according to the video clock signal which will be described in detail hereinafter, and the video signal is amplified by a driver 7 and put into said light modulator 3.

Accordingly, a video signal is generated every time the video clock signal is input into the character generator 6 and the light modulator 3 is controlled by the video signal to amplitude-modulate the recording light beam 2 emitted by the source 1. The modulated light beam then passes through a dichroic mirror 8 and is then reflected by a rotating polygonal mirror 9 which rotates at a constant speed.

On the other hand, a read-out laser beam source 10 emits a read-out light beam 11. As the read-out beam source 10, a helium neon laser source which emits a red laser beam is used. In order that the read-out light beam 11 can be mixed with and afterwards separated from the reading light beam 2, the recording beam source 1 is constituted of an argon ion laser source which emits blue and green laser beam. The read-out light beam 11 is reflected by a mirror 12 and then is reflected by the dichroic mirror 8. The dichroic mirror 8 reflects a red light beam and transmits a blue light beam and a green light beam. Therefore, by selecting the angle of the dichroic mirror 8 with respect to the read-out light beam 11, it is possible to mix the read-out light beam 11 with the recording light beam 2. The mixed light beam impinges upon a facet of the rotating polygonal mirror 9 which consists of a number of flat mirror facets arranged in the form of a polygon. The facets may be polished surfaces of alminium or stainless steel which is, when required, provided with a vacuum evaporated coating layer of chromium or alminium.

The rotating polygonal mirror 9 rotates at a constant speed to deflect periodically the mixed light beam in the direction perpendicular to the axis of rotation of the rotating polygonal mirror 9. The deflected light beam impinges upon a galvanometer 14 by way of a first lens 13. The galvanometer 14 is driven by a saw tooth signal and is swung by a predetermined angle for every scan line to deflect the light beam in the direction perpendicular to the deflecting direction of the rotating polygonal mirror 9. In other words, the light beam is deflected horizontally by the rotating mirror 9 and vertically by the galvanometer 14, though FIG. 1 shows the system in the 90° rotated orientation. Thus, the light beam is deflected in the 2-dimensional directions and a 2-dimensional scanning is conducted. In case that a recording material such as a film 18 in FIG. 1 is intermittently fed in the direction of deflection by the galvanometer 14, the galvanometer 14 can be omitted.

The light beam deflected by the galvanometer 14 is separated by another galvanometer 16 into a recording light beam and a read-out light beam. The recording light beam impinges on a photosensitive material or a film by way of a second lens 17. The recording light beam records on the film 18 characters in the form of a dot pattern. In the illustrated embodiment, the film 18 is fed one frame by one frame.

The read-out light beam is focused by a third lens 15 on a linear encoder 19 and the light beam passing through the linear encoder 19 is focused by a fourth lens 20 on a photodetector 21. The photodetector 21 outputs a photoelectric pulse signal A in accordance with the slit pattern of the linear encoder 19. By the photoelectric pulse signal A, the scanning position of the rotating polygonal mirror 9 is known. Therefore, by providing a video clock signal in synchronization with the photoelectric pulse signal, the positions of the initial dots in the scan lines can be made aligned correctly and all the dots are recorded in the correct position even if there is a fluctuation in rotation of the rotating polygonal mirror 9 or there is an error in the angle of the facets of the polygonal mirror 9.

FIG. 2 shows an example of a linear encoder. The linear encoder 19 has a number of parallel transparent portions 19a at a constant pitch in an opaque plate. The transparent portions 19a are all in the shape of a stripe and have the same width. The length of the transparent portions 19a is substantially equal to the length of the scanning by deflection of the light beam by the rotating polygonal mirror 9, and the width of the transparent portions 19a is larger than the width of scanning by deflection of the read-out light beam by the galvanometer 14.

When a rotating polygonal mirror is used for deflecting a recording light beam, the intensity of the light beam is lowered when the light beam is reflected by the end of the facets defined by an edge 9a between adjacent facets. Therefore, the recording density becomes lower at the ends of the scan lines. In order to prevent the light beam of lower intensity from impinging on the film, the linear encoder 19 is provided at its both ends with opaque portions having a width of a as shown in FIG. 2. While the read-out light beam scans the opaque portions at the ends of the linear encoder 19, no photoelectric pulse signal is obtained from the photodetector 21, which is called blanking period.

Now an example of a linear encoder 19 will be described in detail. When the resolution points are "2000" in number and the number of n-times multiplication, i.e. the number of n is "5", the number of the transparent portions 19a is 400 (2000÷5). The effective area of the linear encoder excluding the opaque portions for blanking period is about 70% of the whole area. Therefore, in the 70% of the whole area of the linear encoder 19, 400 transparent portions 19a are provided.

Figure 4:
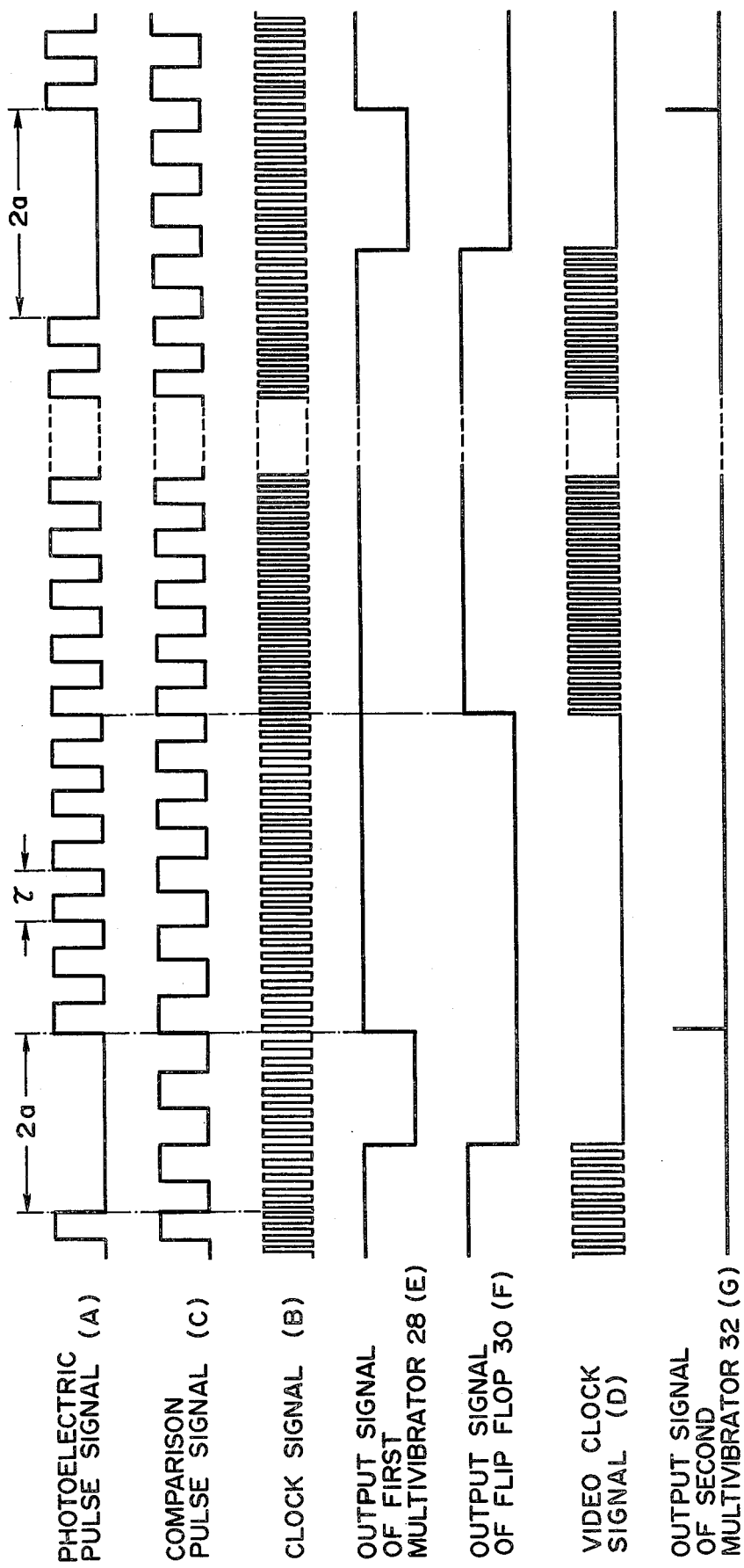
FIG. 4 is a representation showing the wave form of the various signals handled through the PLL circuit in this invention.

FIG. 3 shows a PLL (phase lock loop) circuit for generating a video clock signal to be used in this invention. By horizontally scanning the linear encoder 19 a photoelectric pulse signal A is obtained at the output of the photodetector 21. The photoelectric pulse signal A is amplified up to a predetermined level by an amplifier 22. The amplified photoelectric pulse signal A is shown at (A) of FIG. 4. While the read-out light beam 11 is scanning the opaque portions at the ends of the linear encoder 19, no photoelectric pulse is outputed. Therefore, the period while no pulse is outputed having a length of 2a becomes a blanking period. The photoelectric pulse signal between the blanking periods is outputed by a single horizontal scan by the rotating polygonal mirror 9. The period of the photoelectric pulse signal, $\tau$, is almost constant though it varies a little by the fluctuation in rotation of the rotating polygonal mirror 9.

The photoelectric pulse signal A is input into a phase comparator 23 as a reference signal. The PLL circuit is constituted of the phase comparator 23, a low-pass filter 24, a gain-bias control circuit 25, a voltage control oscillator 26 and a divider 27, which multiplies the photoelectric pulse signal five times. In more detail, a clock signal B is outputed from the voltage control oscillator 26 and is divided into 1/5 by the divider 27. The divided reference pulse signal C is inputed into the phase comparator 23 and the phase thereof is compared with the photoelectric pulse signal A. The comparison of the phase between the two pulse signals gives an output indicative of the degree of difference between the phases and the direction of difference or displacement with its width of pulse. The pulse signal outputed from the phase comparator 23 is converted to a D.C. signal through the low-pass filter 24 and inputed into the gain-bias control circuit 25. The gain-bias control circuit 25 gives an output of a D.C. voltage having a level to correct the displacement of the phases. The output voltage is given to the voltage control oscillator 26.

Thus, the PLL circuit conducts a feedback control to make the phase of the photoelectric pulse signal A registered with the phase of the reference pulse signal C, and effects a phase lock when the phases are registered. Consequently, the voltage control oscillator 26 gives an output of a clock signal B which is synchronized with the photoelectric pulse signal A and has 5-times multiplied frequency.

In the blanking period of the photoelectric pulse signal A where there is not pulse signal, the phase lock is released and the voltage control oscillator 26 oscillates at a desired frequency. Then, upon input of the initial photoelectric pulse signal in the scan line, the phase comparison is started and after a predetermined time (lock-up time) has lapsed, the phases are registered and the phase lock is effected. Therefore, until the phases are registered it is desirable that the clock signal B is not put into the character generator 6 as the video clock signal D.

The photoelectric pulse signal A is inputed into the first multivibrator 28 which can be retriggered. The first multivibrator 28 is constituted of "Ser. No. 74123" (made by Texas Instruments Incorporated) in which the time constant is set to be longer than the period $\tau$ of the photoelectric pulse signal A. The first multivibrator 28 is turned to its "L" state after the horizontal scan was completed and is then turned to its "H" state upon triggered by the initial photoelectric pulse signal A of the subsequent horizontal scan.

The output signal E of the first multivibrator 28 is inputed into the reset side input terminal R of the flip flop 30 and the present counter 29 to reset these circuits by the fall thereof.

The preset counter 29 counts the number of pulses which have been set to nullify the photoelectric pulse signal outputed in the lock-up period of the PLL circuit. In the illustrated embodiment the set number of pulses is 6. Therefore, when 6 photoelectric pulses have been counted, the flip flop 30 is set. The output signal F of the flip flop 30 is inputed into the gate circuit 31 to open the same. The gate circuit 31 is also provided with the clock signal B of the voltage control oscillator 26, and accordingly, when the flip flop 30 is set the gate circuit 31 is opened and the clock signal B is outputed as the video clock signal D which is sent to the character generator 6 shown in FIG. 1.

Thus, the lock-up period is converted to the number of pulses of the photoelectric pulse signal and the number of the pulses is counted by the preset counter 29. Then, when the number of the counted pulses has reached a predetermined number and the phase lock is effected, the flip flop 30 is set to open the gate circuit 31 and the clock signal B is taken out as the video clock signal D. Hence, it is possible to obtain a stable video clock signal D which is synchronized with the photoelectric pulse signal A and has an n-times multiplied frequency with respect thereto. When the lock-up period is long, the effective length of the scan line is short and the resolution is lowered. The lock-up period is determined on basis of the displacement of the phase of the photoelectric pulse signal A from that of the reference pulse signal C and the difference in frequency between the signals A and C. Therefore, when the displacement of the phase and the difference in frequency are small, the amount of correction of phase is small and the lock-up period is short.

In view of this, the output signal E of the first multivibrator 28 is inputed into a second multivibrator 32 which has a very short period and the output pulse signal G of the second multivibrator 32 is used to set the divider 27 so that the phases of said pulse signals are compulsorily registered by the starting point of the initial photoelectric pulse signal and the amount of correction of the phase is made small and the lock-up period is shortened.

Further, by controlling the voltage control oscillator 26 to make the frequency of the reference pulse signal equal to that of the coming photoelectric pulse signal in the blanking period before the lock-up starts, the amount of correction of phase based on the difference in frequency is also reduced and the lock-up time is shortened. Therefore, in view of this, the signal of "L" level of the first multivibrator 28 is taken out in the blanking period and is amplified by an amplifier 33 and the output of the amplifier 33 is inputed into the gain-bias control circuit 25. The amplifier 33 amplifies the output signal of the first multivibrator 28 in the phase-locked period so that an output having the same level as that of the D.C. voltage outputed from the gain-bias control circuit 25 may be obtained even in the blanking period, exactly the period in which the level of the output of the first multivibrator 28 is "L".

In the above-described embodiment of the invention, the video clock signal D is outputed even in the blanking period 2a of the photoelectric pulse signal A. However, since the video clock signal in the blanking period has a wrong frequency the video clock signal should desirably be cut in this period by providing a preset counter and closing the gate circuit by the preset counter when, for instance, 2000 video clock pulses are counted in case that the number of dots in one scan line is set to be 2000.

We claim:

1. In a laser beam recording system in which a recording light beam and a read-out light beam are deflected periodically by a rotating polygonal mirror and the read-out light beam scans a linear encoder behind which a photodetector is located whereby a photoelectric pulse signal is generated by the photodetector,
    a video clock signal generating device for generating a video clock signal in synchronization with the photoelectric pulse signal, said video clock signal generating device comprising;
    an oscillator for generating a clock signal,
    a divider for dividing the clock signal into a reference pulse signal having a frequency of 1/n of that of the clock signal, where said n is an integral number, and
    a phase comparator for detecting the displacement of the phase of said photoelectric pulse signal from that of said reference pulse signal and controlling said oscillator to make the phases of the photoelectric pulse signal and the reference pulse signal registered with each other,
    whereby a video clock signal is generated which is synchronized with said photoelectric pulse signal and has a frequency of n-times as large as that of the photoelectric pulse signal, said video clock signal providing a video signal which is used to modulate the recording light beam.

2. A video clock signal generating device in a laser beam recording system as claimed in claim 1 wherein said linear encoder is a plate having alternately arranged opaque and transparent portions in stripes in the direction of deflection of the light beam by said rotating polygonal mirror.

3. A video clock signal generating device in a laser beam recording system as claimed in claim 1 wherein said oscillator is a voltage control oscillator which generates a pulse signal having a frequency corresponding to the input voltage thereof.

4. A video clock signal generating device in a laser beam recording system as claimed in claim 1 further comprising a preset counter for counting the number of the photoelectric pulses after the horizontal scan by said rotating polygonal mirror is started, a flip flop which is set when a predetermined number of the photoelectric pulses has been counted, and a gate circuit which is opened upon set of the flip flop to transmit the clock signal from said oscillator as a video clock signal, said gate circuit being closed during a lock-up period which is required for the phase of said photoelectric pulse signal to be registered with the phase of said reference pulse signal.

5. A video clock signal generating device in a laser beam recording system as claimed in claim 1 further comprising means for giving an input signal to said oscillator during a blanking period of said linear encoder, and a gate circuit for transmitting said clock signal as a video clock signal, whereby said oscillator operates to make the frequency of said reference pulse signal equal to that of said photoelectric pulse signal even in the blanking period of the linear encoder.

6. A video clock signal generating device in a laser beam recording system as claimed in claim 5 wherein said input signal giving means comprises a multivibrator which has a time constant longer than the period of said photoelectric pulse signal and is triggered by said photoelectric pulse signal, and an amplifier which amplifies the output of said multivibrator and gives a constant D.C. voltage to the oscillator while the level of the output of the multivibrator is "L".

7. A video clock signal generating device in a laser beam recording system as claimed in claim 1 further comprising means for resetting said divider with the initial photoelectric pulse in every scan line whereby the phase of the photoelectric pulse signal and the phase of the reference pulse signal are compulsorily registered with each other.

8. A video clock signal generating device in a laser beam recording system as claimed in claim 7 wherein said resetting means comprises a first multivibrator which has a time constant longer than the period of the photoelectric pulse signal and is triggered by the photoelectric pulse signal, and a second multivibrator connected with the first multivibrator which has an extremely short time constant.

* * * * *